United States Patent [19]
Lavarini et al.

[11] 3,891,944
[45] June 24, 1975

[54] GAS LASER GENERATOR WITH DISCHARGE CONTAINER GAS FLOW CIRCULATION

[75] Inventors: Bernard Lavarini, Paris; Jean-Pierre Crancon, Arpajon; Jean-Yves Thomas, Paris, all of France

[73] Assignee: Compagnie Generale d'Electricite, Paris, France

[22] Filed: Apr. 20, 1973

[21] Appl. No.: 353,174

[30] Foreign Application Priority Data
Apr. 20, 1972 France .............................. 72.14049
May 18, 1972 France .............................. 72.17856

[52] U.S. Cl. .............................. 331/94.5 G; 330/4.3
[51] Int. Cl. .......................... H01s 3/22; H01s 3/09
[58] Field of Search ................... 331/94.5; 330/4.3

[56] References Cited
UNITED STATES PATENTS
3,633,125   1/1972   Whitehouse ...................... 331/94.5

OTHER PUBLICATIONS

Gibbs et al., Physics Letters, Vol. 37 A, No. 3, Nov. 22, 1971, pp. 229–230.

Chemical Abstracts, No. 134084 h, in Vol. 76, 1972, p. 518.

Rich, Applied Physics Letters, Vol. 19, No. 7, Oct. 1, 1971, pp. 230–232, QC 1 A745.

*Primary Examiner*—Robert J. Webster
*Attorney, Agent, or Firm*—Sughrue, Rothwell, Mion, Zinn & Macpeak

[57] ABSTRACT

A gas laser generator utilizing nitrogen and carbon dioxide. An electric discharge is produced in the nitrogen, which is subjected to a whirling flow movement, thereby improving the uniformity of the discharge, prior to mixing with the carbon dioxide in the expansion chamber where laser beam emission occurs.

3 Claims, 3 Drawing Figures

GAS LASER GENERATOR WITH DISCHARGE CONTAINER GAS FLOW CIRCULATION

BACKGROUND OF THE INVENTION

1. Field of the Invention

The present invention relates to a gas laser generator.

2. Prior Art

Laser generators are known in which an electric discharge is produced in a first gas driven at high speed; this first gas then being mixed with a second gas in an expansion chamber in which a resonant optical cavity is disposed. The electric discharge has the effect of providing this first gas with an excitation energy which is then transferred to the second gas by molecular interaction. Excitation of this second gas causes the latter to emit light stimulated in the optical cavity, i.e., a laser beam.

There are three ways of exciting the molecules of the first gas, which is generally nitrogen: by thermal action, rotation, or vibration. The relaxation rates of the first two methods are lower than the relaxation time of the latter. As a result, when the nitrogen molecules and the molecules of the second gas, generally carbon dioxide, mix in the expansion chamber, the vibrational energy of the nitrogen produces population inversion in the carbon dioxide, thus producing a high powered laser impulse.

However, devices of this nature have certain disadvantages.

More particularly, the structure and the mutual disposition of the elements consituting generators of this type do not allow high powered and uniform electric discharges to be obtained in the nitrogen, thus restricting the power and efficiency of the laser beam.

SUMMARY OF THE INVENTION

The object of the present invention is to obviate such disadvantages and to provide a gas laser generator capable of producing particularly powerful and uniform electric discharges, thereby producing high powered laser emissions. The laser generator according to the invention should also possess a very simple structure and is designed to be produced at a reasonable cost.

The present invention relates to a gas laser generator comprising: an extended container provided with transfer openings at a first end; means for supplying the container with at least one jet of a first gas capable of being excited by an electric discharge, these means comprising an injection pipe opening into the container close to its second end; electrodes disposed in the container capable of producing an electric discharge in the first gas; an extended expansion chamber to which the container is connected by way of the transfer openings, the section of this expansion chamber increasing progressively from its first end adjacent the container to its second end; evacuation means for keeping the second end of the expansion chamber at low pressure and for circulating the first gas coming from the injection pipe to the second end of the expansion chamber by way of the transfer openings; means for supplying the expansion chamber with at least one second gas capable of being excited by molecular interaction with the first gas in its excited state, these supply means being located close to the container so as to cause the first and second gases to mix; a resonant optical cavity capable of producing a laser emission in the presence of the second gas in its excited state, this cavity being disposed in the expansion chamber in such a manner as to be traversed by the gaseous mixture.

The laser generator is characterized in that the dimensions of the container, the diameter and position of the injection pipe, the injection rate of the first gas, and the dimensions of the transfer openings are such as to produce a whirling flow movement of the first gas throughout this container.

Other objects, features and advantages of the present invention will be made apparent from the following detailed description of the preferred embodiment thereof, provided by way of example only, with reference to the accompanying drawings, in which:

DESCRIPTION OF THE PREFERRED EMBODIMENTS

Figure 1:
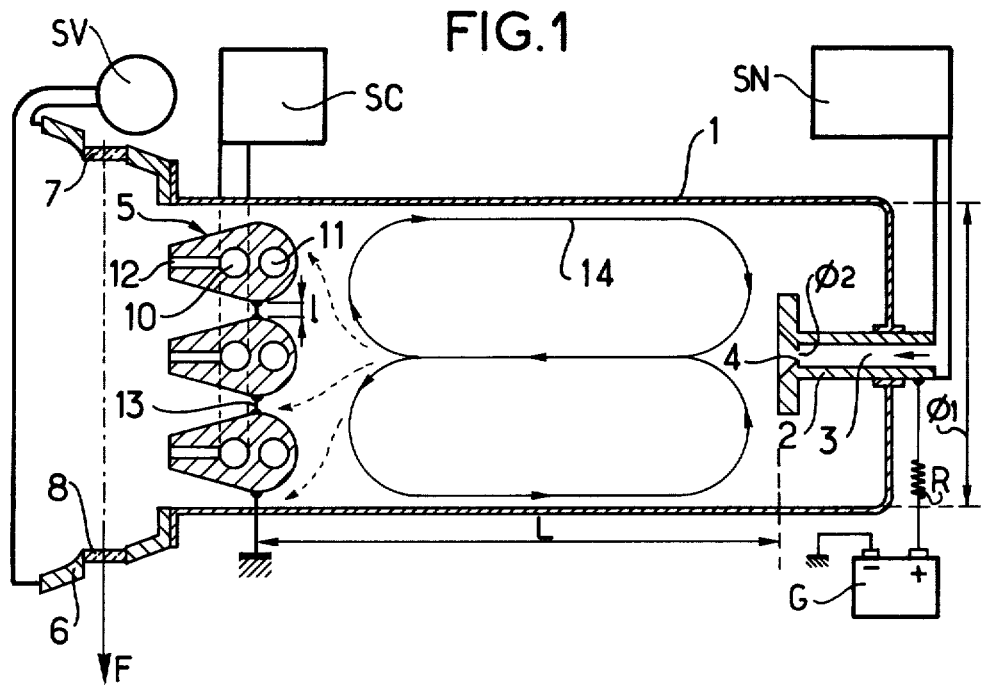
FIGS. 1 and 3 are diagrammatic sectional views of two embodiments of a gas laser generator according to the invention.
Figure 2:
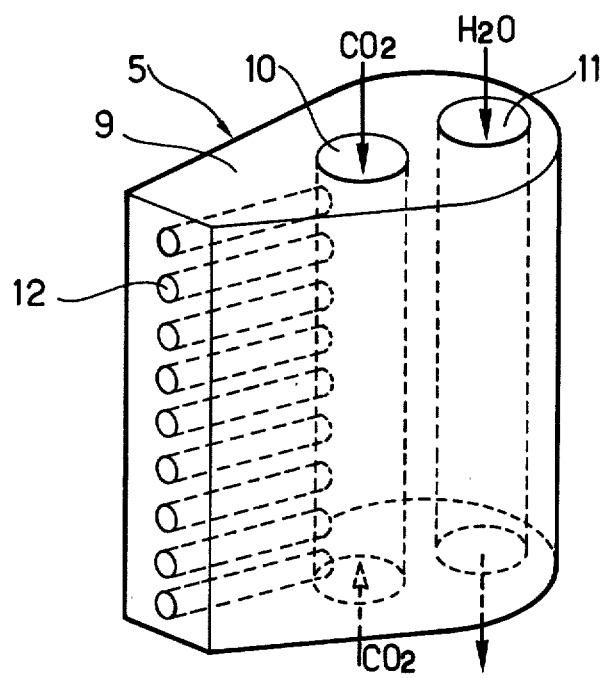
FIG. 2 is a perspective view of an injector used in the laser according to the invention.

According to FIG. 1 a gas laser generator comprises a container 1 having a diameter of $\phi$ 1 into which empties an injection pipe 2 constituting an anode and being connected to a voltage generator G by means of a resistance R. This pipe 2 comprises an axial conduit 3 connected to a nitrogen source under pressure SN, which is represented in diagrammatic form. The leading face of the conduit 3 also comprises an injection opening 4 having a diameter of $\phi$ 2 and diverging towards the interior of the container 1. Carbon dioxide injectors 5 are disposed at a substantially equal distance 1 from each other at the other end of the container 1 at a distance L from the end of the pipe 2. These injectors are supplied from a carbon dioxide source SC. With particular reference to FIG. 2, these injectors are electrically connected to the other pole of the voltage generator G by means of the conductors 13.

The container 1 opens into an expansion chamber 6 provided with two mirrors 7 and 8 constituting a resonant optical cavity. The mirror 8 is semi-transparent and thus ensures the laser emission in the direction of the arrow F.

The widest end of the expansion chamber is kept at very low pressure by evacuation means consisting of channels connecting it to a vacuum arrangement SV. This arrangement is represented in FIG. 1 in diagrammatic form. Its size is sufficient to ensure that the pressure in it remains at practically zero during the entire operation of the laser generator.

FIG. 2 provides a more detailed view of the structure of the injectors 5. Each comprises a profilated metal body 9 in which is provided a channel 10 connected by its two ends to a carbon dioxide (CO2) and helium source, and a channel 10 in which circulates a cooling fluid, in this case water ($H_2O$). The channel 10 feeds a plurality of carbon dioxide injection tubes 12 having a constant section.

The laser generator according to the invention operates in the manner described hereafter:

The nitrogen introduced under pressure into the axial conduit 3 of the pipe 2 is injected at supersonic speed into the container 1 by means of the injection opening 4. By choosing suitable values for the parameters L, $\phi$ 1, and $\phi$ 2, defined above, and for the relationship L/$\phi$ 1, a main whirling flow movement of the nitrogen is produced in the container 1, as is represented essentially by the arrows 14 indicated in the form of continuous lines. This type of whirling flow movement ensures a uniform distribution of the electric discharge released when supplying the anode 2 and the conductors 13 by means of the generator G.

Part of the nitrogen carried along by the main flow movement then flows between the injectors 5 and the wall of the container 1, forming a secondary flow movement represented by the arrows, and propelling the carbon dioxide and the helium injected through the tubes 12. The carbon dioxide is then excited in the manner described in the preceding account and thus produces a laser emission in the direction of the arrow F.

Figure 3:
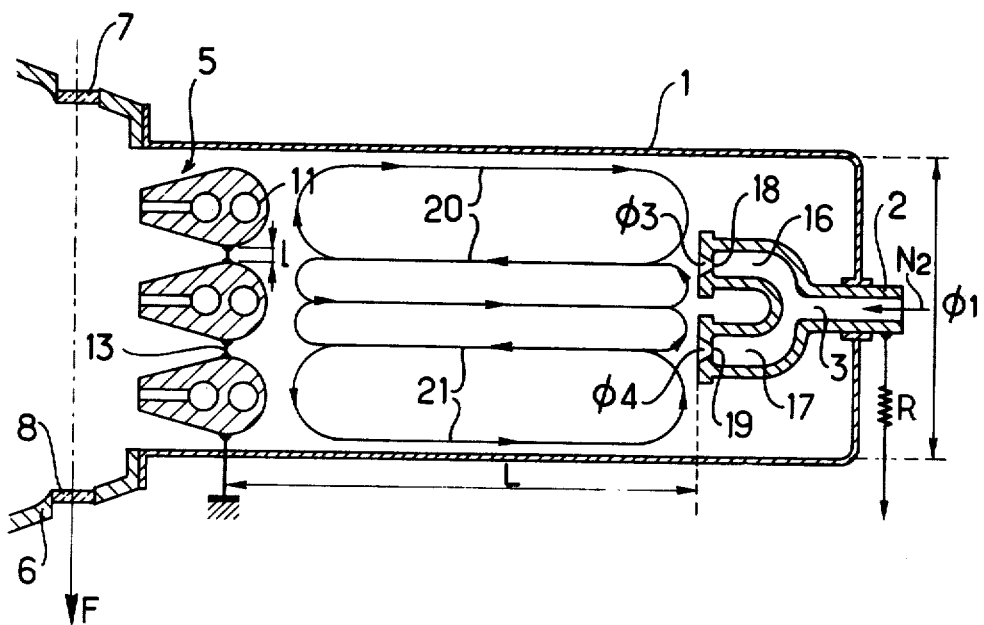

According to the embodiment represented in FIG. 3, in the same way as in FIG. 1, the conduit 3 splits up into two conduits 16 and 17 terminating in two injector openings 18 and 19 respectively, each diverging towards the interior of the container 1.

The operation of the generator as a whole is comparable to that already described.

However, by a suitable choice of the parameters L, as defined above, a double whirling flow movement of the nitrogen in the container 1, is produced. These movements are substantially as indicated by the arrows 20 and 21. This ensures a particularly uniform distribution of the electric discharge released when the anode 2 and the conductors 13 are supplied with power by means of the electric generator (not shown on FIG. 3).

It is obviously possible to use a pipe 2 comprising more than two injector openings. Likewise, it is also possible to utilize a plurality of pipes 2 comprising one or more injector openings.

What is claimed is:

1. A gas laser generator comprising:
    an extended container,
    a plurality of equally, laterally spaced, transversely aligned aerodynamically profiled gas injectors positioned within said container adjacent a first end thereof and forming with said container transfer openings at said first end,
    an injection pipe opening into said container close to its second end for supplying said container with at least one jet of a first gas capable of being excited by an electric discharge,
    longitudinally spaced electrodes disposed in the container at respective ends for producing an electrical discharge in the first gas,
    an extended expansion chamber connected to the first end of the container and increasing in diameter progressively from the first end of the chamber adjacent the container to its second end,
    evacuation means for maintaining the second end of the expansion chamber at low pressure and for circulating the first gas from the injection pipe through said extended container and into the expansion chamber by way of the transfer openings,
    said profiled gas injectors including gas discharge nozzles facing into the expansion chamber and supplied with at least one second gas capable of being excited by molecular interaction with the first gas in its excited state and being downstream of said electrical discharge, so as to cause the first and second gases to mix,
    a cavity capable of amplifying a laser emission in the presence of the second gas in its excited state; said cavity being arranged in the expansion chamber in such a manner as to be traversed by the gaseous mixture downstream of said nozzles, said generator being characterized in that the dimensions of the container, the diameter and position of the injection pipe, the injection rate of the first gas and the dimensions of the transfer openings are such as to produce a whirling flow movement of the first gas longitduinally throughout said container, upstream of said nozzles with a first, inner flow portion extending longitudinally from the second end to the first end, between said electrodes, and at least one second flow portion radially outwards of the first flow portion reversed thereto near the sidewalls of said container.

2. A generator according to claim 1, characterized in that the container is a cylinder having a circular section and that said injection pipe is disposed along the axis of the cylinder.

3. A generator according to claim 1, characterized in that the supply means comprise two injection pipes opening into the container in the proximity of its second end.

* * * * *